(12) United States Patent
Szober et al.

(10) Patent No.: US 10,929,946 B2
(45) Date of Patent: Feb. 23, 2021

(54) DISPLAY BUFFERING METHODS AND SYSTEMS

(71) Applicant: Channel One Holdings Inc., Tampa, FL (US)

(72) Inventors: Gregory Szober, Waterloo (CA); Stephen Viggers, Waterloo (CA); Aidan Fabius, Waterloo (CA)

(73) Assignee: Channel One Holdings Inc., Tampa, FL (US)

(*) Notice: Subject to any disclaimer, the term of this patent is extended or adjusted under 35 U.S.C. 154(b) by 0 days.

(21) Appl. No.: 16/428,072

(22) Filed: May 31, 2019

(65) Prior Publication Data

US 2019/0370928 A1 Dec. 5, 2019

Related U.S. Application Data

(60) Provisional application No. 62/679,140, filed on Jun. 1, 2018.

(51) Int. Cl.
| | |
|---|---|
| *G06T 1/20* | (2006.01) |
| *G06F 9/38* | (2018.01) |
| *G06F 9/54* | (2006.01) |
| *G09G 5/399* | (2006.01) |

(52) U.S. Cl.
CPC .............. *G06T 1/20* (2013.01); *G06F 9/3814* (2013.01); *G06F 9/3871* (2013.01); *G06F 9/3877* (2013.01); *G06F 9/544* (2013.01); *G09G 5/399* (2013.01)

(58) Field of Classification Search
CPC ....... G06T 1/20; G06F 9/3814; G06F 9/3871; G06F 9/3877; G06F 9/544; G09G 5/399
See application file for complete search history.

(56) References Cited

U.S. PATENT DOCUMENTS

| | | |
|---|---|---|
| 2006/0132491 A1 | 6/2006 | Riach et al. |
| 2010/0020088 A1* | 1/2010 | Harumoto .............. G09G 5/395 345/522 |
| 2010/0026689 A1 | 2/2010 | Parikh et al. |

(Continued)

FOREIGN PATENT DOCUMENTS

| | | |
|---|---|---|
| EP | 2128824 A1 | 12/2009 |
| EP | 3336833 A1 | 6/2018 |

(Continued)

OTHER PUBLICATIONS

Khoury, Tony, "PCT Written Opinion of the International Searching Authority", PCT International Application No. PCT/CA2019/050009 filed on Jan. 4, 2019, dated Sep. 6, 2019, Gatineau, Quebec.

(Continued)

*Primary Examiner* — Saptarshi Mazumder
(74) *Attorney, Agent, or Firm* — Woods Oviatt Gilman LLP; Dennis B. Danella, Esq.

(57) ABSTRACT

Multiple-buffered display rendering without the use of hardware or software interrupts. Five buffers can be used: two designated as front buffers and three designated as back buffers. Initially, all five buffers may be targeted for rendering in round robin fashion. As frames are rendered and processed by the graphics device, a frame index counter may be updated to track the ordinal number of each frame rendered by the GPU.

17 Claims, 7 Drawing Sheets

(56) References Cited

U.S. PATENT DOCUMENTS

| | | |
|---|---|---|
| 2011/0023040 A1 | 1/2011 | Hendry et al. |
| 2012/0133732 A1* | 5/2012 | Li .................. H04N 13/398 |
| | | 348/43 |
| 2014/0092150 A1 | 4/2014 | Slavenburg et al. |
| 2017/0154403 A1 | 6/2017 | Toth et al. |
| 2017/0228855 A1* | 8/2017 | Bates ................. G06F 3/011 |
| 2018/0197509 A1 | 7/2018 | Kobayashi et al. |
| 2018/0277054 A1 | 9/2018 | Colenbrander |
| 2019/0043156 A1 | 2/2019 | Fabius |

FOREIGN PATENT DOCUMENTS

| | | |
|---|---|---|
| WO | 99/40518 | 8/1999 |
| WO | WO2006/126042 A1 | 11/2006 |
| WO | 2017/026230 | 2/2017 |

OTHER PUBLICATIONS

Ricks, Donna J., "Office Action Summary", U.S. Appl. No. 16/027,525 filed on Jul. 5, 2018, Alexandria, VA.

Pichon, Jean-Michael, European Search Report, dated Jul. 11, 2019, 17 pages, European Application No. 18182141.4-1209, European Patent Office.

Giancane, Iacopo, European Search Report, dated Jun. 27, 2019, 11 pages, European Application No. 19177537.8-1210, European Patent Office.

\* cited by examiner

DISPLAY BUFFERING METHODS AND SYSTEMS

CROSS-REFERENCE TO RELATED APPLICATIONS

This application claims the benefit of U.S. Provisional Application No. 62/679,140 filed on Jun. 1, 2018, which is incorporated by reference herein in its entirety.

FIELD

The embodiments disclosed herein relate to rendering computer graphics and, in particular, to methods and systems for buffering images for display in safety-critical environments, such as in aviation.

INTRODUCTION

The following paragraphs are not an admission that anything discussed in them is prior art or part of the knowledge of persons skilled in the art.

Graphical applications running in a safety-critical environment may require assurances that display data is free from defects and artifacts, and represent the data that is actually intended for display by graphical applications.

Conventionally, double or triple buffering techniques are used in computer graphics systems to ensure that data is correctly displayed. Multiple buffering, as these techniques are called, allow for display data to be shown without "tearing" and with minimal latency. In particular, multiple buffering allows for asynchronous reading and writing of the buffers by one or more graphical applications, which write data, and one or more graphic processing units (GPUs), which read data. In the absence of multiple buffering, and especially triple buffering, the graphical applications must either wait for frame data to be read before writing, or else the GPU may display only partially complete frame data. The former can result in "stutter" and reduced performance, while the latter can result in "tearing", among other artifacts.

In some cases, it may be possible to force synchronization of writes with vertical sync (VSYNC) intervals. However, this can result in reduced performance in the best case, and may cause difficulties in system implementation, such as where multiple central processing units (CPUs) or GPUs are used. For this reason, asynchronous writing and reading of buffers is traditionally preferred.

Traditional implementations of triple buffering rely on the use of hardware or software interrupts (i.e., signals that cause the execution of lower-priority code to be interrupted in favor of the execution of higher-priority code) to select which of the three buffers is to be shown during a next VSYNC interval of the display hardware. This is because graphics rendering is time-sensitive and a heavily loaded processor may be otherwise unable to process the reading and writing of frame data quickly enough to ensure that the GPU reads complete frame data. In doing so, the system allows for maximum performance in the generation of frame data, minimal latency in displaying the frame data, and therefore a smooth flow of frame data to the display, free of artifacts.

Although multiple buffered frame data is generally desirable, in some systems, such as safety critical real-time systems, the use of interrupts may not be desirable, or possible, which makes it difficult to take advantage of the traditional triple buffering approach. Even where interrupts are possible, their use may cause significant difficulties when certifying the system to ensure that it is reliable and free of potentially critical errors or race conditions.

SUMMARY

In a first broad aspect, there is provided a method of controlling asynchronously buffered rendering by a GPU to a display in a safety critical environment, the method comprising: providing a plurality of buffers, the plurality of buffers comprising at least five frame buffers; a CPU submitting frame rendering data corresponding to a first new frame to a GPU; the CPU instructing the GPU to write a frame index number of the first new frame and a display index number to a log accessible to the CPU, wherein the frame index number identifies a count of frames rendered by the GPU and the display index number identifies a count of frames displayed by the display; the CPU determining whether the display index number has changed; and in response to detecting that the display index number has changed, locking one or more buffers in the plurality of buffers as potentially displayed buffers.

In some cases, the method may further comprise unlocking one or more previously used buffers in the plurality of buffers in response to detecting that the display index number has changed.

In some cases, the method may further comprise determining at least one unused buffer from the plurality of buffers is currently unused and, in response to determining that at least one of the plurality of buffers is currently unused, selecting a new buffer from the at least one unused buffer for use in rendering a second new frame.

In some cases, the method may further comprise repeating, for the second new frame, the submitting frame rendering data, instructing the GPU and determining whether the display index number has changed.

In some cases, the unlocking comprises determining whether the one or more previously used buffers correspond to frames with respective frame index numbers lower than the frame index number of the first new frame.

In some cases, determining whether the display index number has changed comprises detecting that a first vertical sync has occurred.

In some cases, the plurality of buffers are stored in a memory shared by the CPU and the GPU.

In some cases, the log is stored in a memory shared by the CPU and the GPU.

In some cases, the potentially displayed buffers comprise at least two buffers.

In some cases, determining the potentially displayed buffers comprises selecting a first frame buffer which is associated with the first display index count, and a second frame buffer that immediately precedes the first frame buffer.

In another broad aspect, there is provided a non-transitory computer readable medium storing computer-executable instructions, which when executed by a computer processor, cause the processor to carry out the methods as described herein.

In another broad aspect, there is provided an asynchronously buffered graphic display rendering system, the system comprising: a memory storing a plurality of buffers, the plurality of buffers comprising at least five frame buffers; a GPU; a processor configured to: submit frame rendering data corresponding to a first new frame to the GPU; instruct the GPU to write a frame index number of the first new frame and a display index number to a log accessible to the CPU, wherein the frame index number identifies a count of frames rendered by the GPU and the display index number identifies a count of frames displayed by the display; determine whether the display index number has changed; and in response to detecting that the display index number has changed, lock one or more buffers in the plurality of buffers as potentially displayed buffers; and a display controller configured to display one of the potentially displayed buffers upon a next vertical sync interval.

In some cases, the processor is configured to unlock one or more previously used buffers in the plurality of buffers in response to detecting that the display index number has changed.

In some cases, the processor is configured to determine that at least one unused buffer from the plurality of buffers is currently unused and, in response to determining that at least one of the plurality of buffers is currently unused, select a new buffer from the at least one unused buffer for use in rendering a second new frame.

In some cases, the processor is configured to repeat, for the second new frame, the submitting frame rendering data, instructing the GPU and determining whether the display index number has changed.

In some cases, the unlocking comprises determining whether the one or more previously used buffers correspond to frames with respective frame index numbers lower than the frame index number of the first new frame.

In some cases, determining whether the display index number has changed comprises detecting that a first vertical sync has occurred.

In some cases, the plurality of buffers are stored in a memory shared by the CPU and the GPU.

In some cases, the log is stored in a memory shared by the CPU and the GPU.

In some cases, the potentially displayed buffers comprise at least two buffers.

In some cases, determining the potentially displayed buffers comprises selecting a first frame buffer which is associated with the first display index count, and a second frame buffer that immediately precedes the first frame buffer.

DRAWINGS

For a better understanding of the various embodiments described herein, and to show more clearly how these various embodiments may be carried into effect, reference will be made, by way of example only, to the accompanying drawings which show at least one exemplary embodiment, and in which are now described:

FIGS. 3A to 3D are tables illustrating display rendering sequences using one example buffering method according to at least one embodiment.

Figure 1:
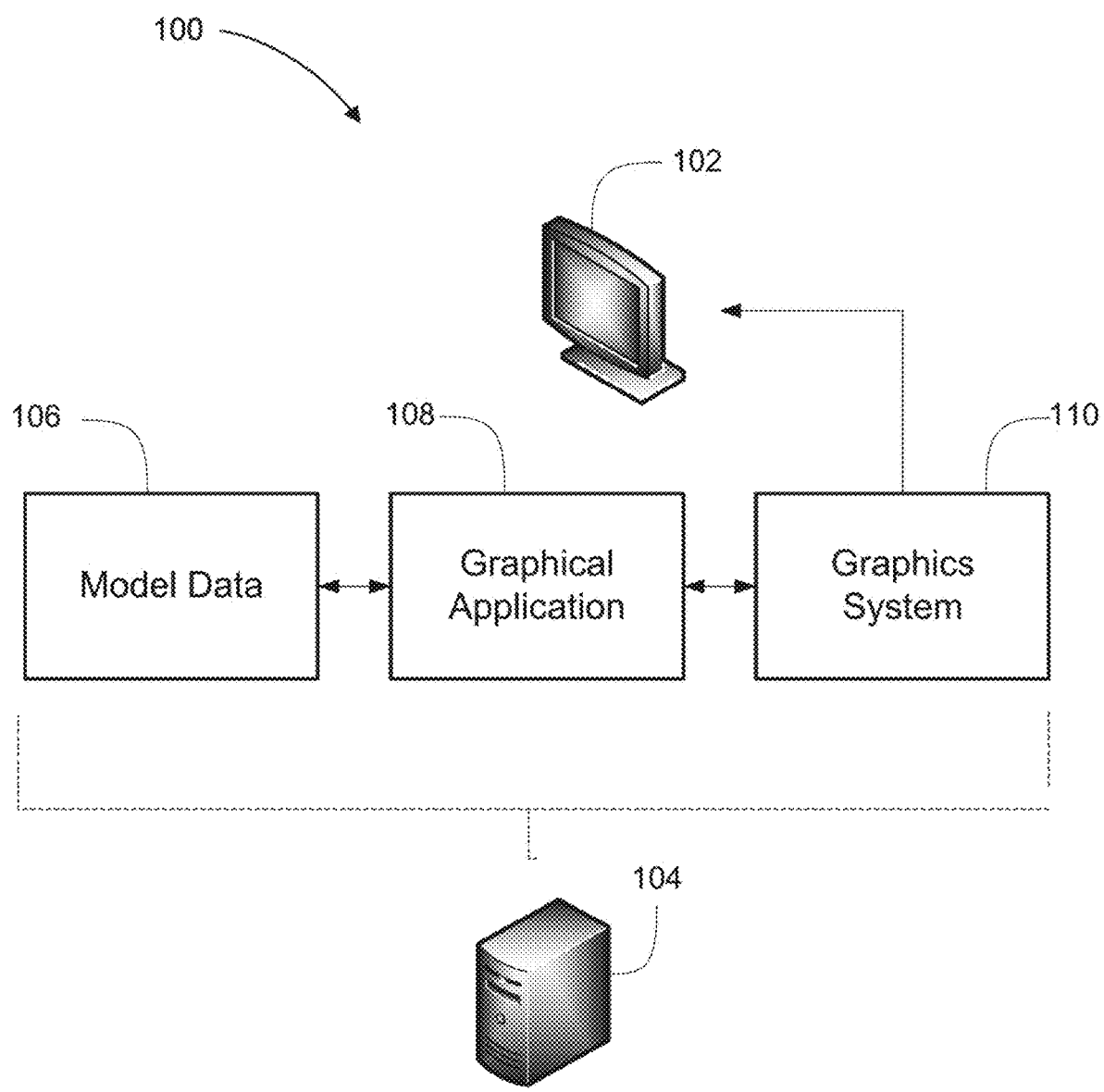
FIG. 1 is a schematic diagram of a host computer system according to at least one embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. This may also include any graphics rendering device that renders 2D or 3D graphics.

Generally, graphical applications running in a safety-critical environment may require assurances that an image created by the GPU corresponds to the image that the graphical applications actually intended.

The described embodiments generally provide for the use of triple- or multiple-buffering techniques, without the use of interrupts or explicit synchronization.

Referring now to FIG. 1, illustrated therein is a host computer system 100 according to at least one embodiment. The host computer system 100 comprises a computer display or monitor 102, and a computer 104. Other components of the system are not shown, such as user input devices (e.g., a mouse, a keyboard, etc.). Generally the host computer system 100 may be used for displaying graphics objects or images on the display or monitor 102.

According to at least one embodiment, the host computer system 100 may be a computer system used in a motorized vehicle such as an aircraft, marine vessel, or rail transport vehicle, or in a medical imaging system, a transportation system, or any other system that uses a computer and monitor. In some cases, the computer system may be in use in a safety critical environment.

The computer 104 may generally include system memory, storage media, and a processor (CPU). In some cases, the computer 104 may also include dedicated graphics hardware, which may include a graphics system 110 and video memory. In other cases, the computer 104 may perform at least some graphics-related operations using the processor and system memory.

According to at least one embodiment, the host computer system 100 may be a safety-critical, mission-critical, or high-reliability system. In such a case, the host computer system 100 may be required to comply with specific operating standards, such as standards related to reliability and fault tolerance.

In order to display a rendering of the model data 106 on the monitor 102, such as may be determined by a graphical application 108 of the host computer system 100, the model data 106 must first be processed by a graphics system 110. The graphics system 110 may receive the model data 106 and may also receive instructions from the graphical application 108 as to how the model data 106 should be processed.

The graphics system 110 may include any or all of a GPU and video memory, and it may use any or all of the CPU and system memory as well.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. The term "CPU", as used herein, broadly refers to a device with the function or purpose of a central processing unit, independent of specific graphics-rendering capabilities, such as executing programs from system memory. In some implementations, it is possible that a SoC may include both a GPU and a CPU; in which case the SoC may be considered both the GPU and the CPU.

Figure 2:
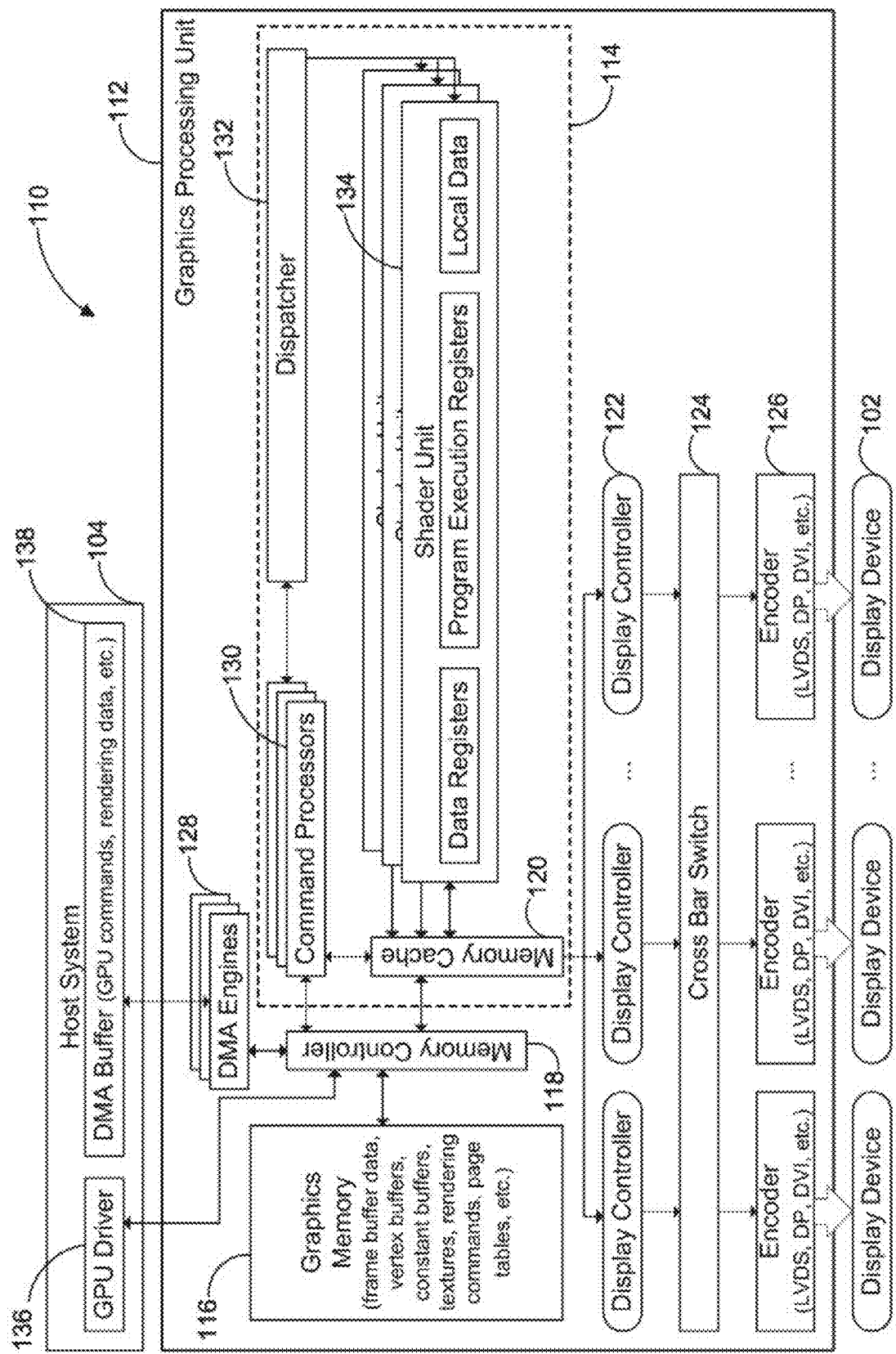
FIG. 2 is a high-level architectural diagram of a graphics system according to at least one embodiment.

Referring now to FIG. 2, illustrated therein is a graphics system 110 according to at least one embodiment. The graphics system 110 may include a GPU 112 and some of the computer 104. In this example the GPU 112 is shown as including graphics memory (sometimes referred to as video memory or VRAM) 116, a memory controller 118, memory cache 120, display controllers 122, a cross-bar switch 124, encoders 126, direct memory access (DMA) engines 128, command processors 130, a dispatcher 132, and shader units 134. Generally, the memory cache 120, command processors 130, dispatcher 132, and shader units 134 may be referred to collectively as a GPU engine 114. The GPU engine 114 may provide GPU subsystems.

Although the GPU 112 in FIG. 2 is shown to include components such as the display controller 122, cross-bar switch 124, and encoders 126, it will be understood that components such as the display controller 122, cross-bar switch 124, and encoders 126 may be logically separate entities from the GPU 112. In particular, the display controller 122, cross-bar switch 124, and encoders 126 may be logically and/or physically separate from the GPU 112.

The graphics system 110 may further include a GPU driver 136 and a DMA buffer 138, which are a part of the computer 104. The memory controller 118 may be coupled to the GPU driver 136. The DMA engines 128 may be coupled to the DMA buffer 138. The DMA buffer 138 may provide commands and rendering data 106 to the DMA engines 128 of the GPU 112.

The graphics memory 116 may store data including, but not limited to, frame buffer data, vertex buffers, constant buffers, textures, rendering commands, page tables. The memory controller 118 may access data stored on the graphics memory 116 and provide data and commands to the GPU engine 114. The GPU engine 114 may process the data and commands and in response, create an image that is provided to the memory controller 118 for storage in the graphics memory 116. The image may include one or more lines, wherein each line includes at least two pixels.

A display controller 122, via the memory controller 118, may extract the image for display from the graphics memory 116. The display controller 122 may convert the image to a display output that is compatible with the display 102. The display output may be provided to the cross bar switch, which in turn, is provided to the encoders 126. The encoders 126 may be coupled to the display 102, and may encode the pixel data according to the format used for connection to the display 102. Examples of encoders include Low-Voltage Differential Signalling (LVDS), Digital Visual Interface (DVI), DisplayPort (DP), and the like.

In traditional interrupt driven triple buffering, a graphics driver allocates three buffers (e.g., buffers A, B, and C) which are used as the destination for rendering data from an application. Two of these buffers are used as "back" buffers which are the target for rendering in a round-robin style. The third buffer is considered a "front" buffer and is the buffer that contains the data currently shown on the display. For example, buffer A receives the first frame of data and buffer B receives the second frame of data, then buffer C receives the third frame of data (overwriting its previous contents) and so on. When a VSYNC (also called Vertical Blanking Interval) occurs an interrupt is raised by the graphics device to indicate that the VSYNC is occurring. With the interrupt, the most recently rendered back buffer becomes the new front buffer and the previous front buffer becomes a back buffer. The new front buffer is then excluded from the round-robin rendering sequence of buffers (as it is the one whose content is currently shown on the display) until the next interrupt sequence.

This process is repeated, allowing the rendering application to render new frames as frequently as desired, and without the requirement of synchronization with the vertical refresh rate of the display hardware (i.e., asynchronously).

The described embodiments generally provide for a multiple-buffered display rendering without the use of hardware or software interrupts, which can be used, e.g., in safety critical environments. Generally, the non-interrupt buffering approach employs synchronization between three otherwise asynchronous entities: the display device, the display controller and the GPU driver.

In an example approach, five buffers can be used, with two buffers designated as "front buffers" and three buffers designated as "back buffers". One of the back buffers can be further designated as the "next to be displayed" buffer. In some embodiments, additional back buffers can be provided, if desired.

When first initialized, all five buffers may be targeted for rendering in round robin fashion. As frames are rendered and processed by the graphics device, a frame index counter may be updated to track the ordinal number of each frame rendered by the GPU. The frame index counter may be written into shared memory, where that shared memory is shared by the graphics unit and display controller and, optionally, the CPU. A separate display index counter may also be written into the shared memory, and may be updated to track the ordinal number of each VSYNC interval. In some cases, the shared memory may be system memory, GPU memory, or some combination thereof.

To safeguard against concurrent read/write issues or partial writes, frame index counter and display index counter updates may be written in pairs. In addition, mirrored or multiply-redundant writes may be used to ensure the integrity of data. That is, each time it is updated, an index counter may be written to memory two or more times, in separate memory locations, to facilitate verification of the data correctness as it is read back from memory.

For example, indexes may be updated using the following sequence of writes:

F1, V1, F2, V2, . . .

where F represents a frame index counter write, V represents a display index counter write, and the numeral 1 represents a first write of a particular data value (e.g., frame index counter value), and the numeral 2 represents a second write of the same particular data value. For data to be considered validly written, F1 will equal F2, and V1 will equal V2. Generally, the graphics driver can read the counter values back in reverse order to the order in which they are written (e.g., V2, F2, V1, F1), before comparing whether V2=V1 and F2=F1. If either condition is false, then it can be inferred that one or more values were read while the GPU was updating the counter. If both conditions are true, then it can be inferred that a "good" read operation has been performed and the index counter data can be relied upon. In some cases, additional redundant writes may be used to provide additional safeguards (e.g., triple or quadruple writes), although there may be diminishing returns in terms of memory and processing efficiency.

Put another way, the frame index counter and the display index counter may be considered together as an index counter tuple, which has multiple copies in memory. To ensure integrity of a read operation, each of the multiple copies of the index counter tuple should be identical for a read operation to be considered reliable.

In some embodiments, the graphics driver may keep a log or history of recent updates to the index counters, for example, by using a circular buffer of a fixed size to store recent updates, or by using an indefinite length log file that is periodically trimmed. Preferably, the size of the history corresponds to the number of buffers in use. For example, if five buffers are available, then the log will contain five tuples corresponding to the five most recent updates, not including mirrored or redundant copies.

Writing both the frame index counter and the display index counter in pairs or tuples allows the graphics driver to establish when each frame was rendered and what the VSYNC count was at the time the frame was rendered. In some alternative embodiments, however, different schemes can be used to match up frame index numbers and display index numbers (e.g., using high resolution timestamps).

In some embodiments, it may not be possible or desirable to directly identify which buffer is currently being used for display. In such cases, the graphics driver may infer which of the five buffers is currently being used for display, to ensure the buffer is not overwritten while the display device is displaying the frame data. Furthermore, to avoid a possible race condition with the display index counter that may cause the display controller to "latch" to the most recently rendered buffer, it may not be possible for the graphics driver to be certain which of two given buffers are actually displayed on screen.

To infer which buffers may be currently used for display, the graphics driver can wait until a VSYNC is observed, for example by waiting until the display index counter changes. Once the change in the display index counter is observed, the graphics driver may look "backwards" through the previous tracking information (e.g., as stored in the log or history) to establish when the graphics device reported going from display index count X to display index count Y (where Y is the most recent display index count and X<Y). The graphics driver can then identify the associate frame index counter values (from the pair or tuple that straddles the transition from display index count X to display index count Y), and mark the associated frame buffers as "potentially displayed". Frame buffers marked as "potentially displayed" are not used again as targets for rendering until the next display index count transition (e.g., until the next VSYNC occurs). Table A below illustrates one example sequence of frame index counters and display index counters:

TABLE A

| reference | a | b | c | d | e | f | h | i |
|---|---|---|---|---|---|---|---|---|
| F | . . . | 375 | 375 | 376 | 377 | 377 | 378 | 379 . . . |
| V | . . . | 976 | 976 | 977 | 977 | 977 | 977 | 977 . . . |

As can be observed from Table A, the change from display index count 976 to 977 occurs while either the frame with index 375 or 376 is being displayed. Accordingly, the buffers for both frames (i.e., indexes 375 and 376) associated with the display index transition can be marked as potentially displayed, and not eligible as rendering targets.

Out of the remaining buffers which are eligible rendering targets, the graphics driver may attempt to ensure that at least one buffer is available as a rendering target, and another is eligible to chosen as the next displayed frame. To accomplish this, the graphics driver may, upon completing rendering to a particular buffer, mark the completed buffer as "next to be displayed." At the same time, the buffer that was previously marked as "next to be displayed" can be marked as available for rendering. If a total of five buffers are used, then in any given VSYNC interval, up to two buffers can be locked as "potentially displayed," one buffer can be locked as "next to be displayed," and up to two remaining buffers may be "available" as rendering targets.

Figure 3A:
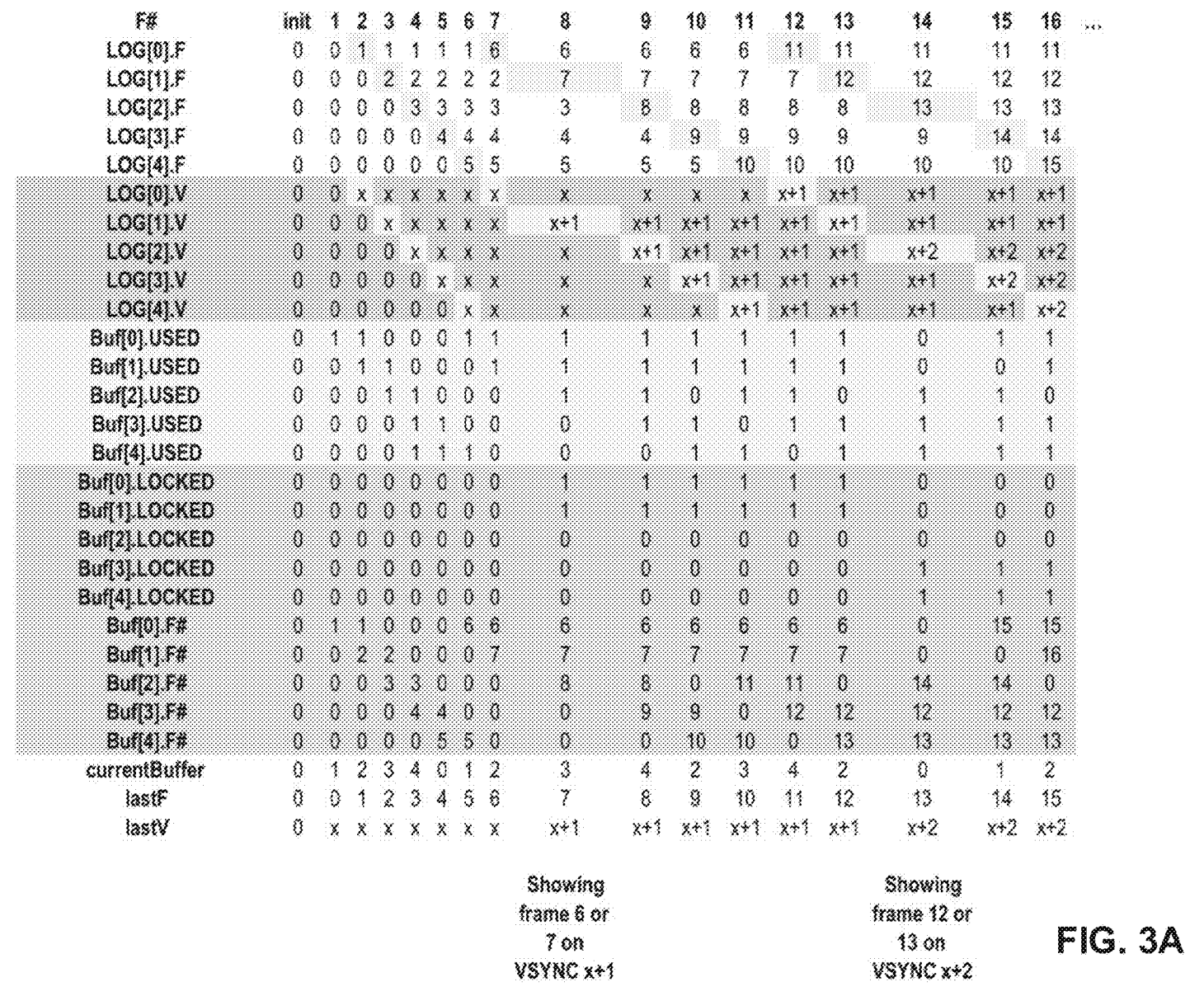

Referring now to FIG. 3A, there is illustrated an example table data generated during a display rendering sequence using one example buffering method as described herein. The rows of table 300A are grouped into frame index counter history (i.e., LOG[n].F), display index counter history (i.e., LOG[n].V), buffer lock status (i.e., Buf[n].LCKD), buffer presently displayed status (i.e., Buf[n].PD), and buffer frame number (i.e., Buf[n].F #). Table 300A further contains a row showing the current target buffer for rendering (i.e., currentBuffer), the most recent frame index number (lastF) and the most recent display index number (lastV). The columns of table 300A correspond to time slices of processing by a CPU. In the example of table 300A, each time slice corresponds to one frame rendering period.

Both the frame index counter history and the display index counter history contain five entries, and it can be observed that each of the frame index counter history and display index counter history can be updated in round-robin fashion. That is, when updating each history, the log entry with index 0 may be updated first, followed next by the log entry with index 1, the log entry with index 2, and so on, until looping back to the log entry with index 0.

Each buffer lock status corresponds to a particular display buffer in memory. A "1" indicates that the buffer is locked to prevent writing by the graphics driver. Locks may be put in place either because the buffer is considered "presently displayed" or because the buffer is considered "next to be displayed." A "0" indicates that the buffer is available as a rendering target, and that any data it contains can be safely overwritten.

Each buffer presently displayed status shows whether the buffer is considered by the system to be presently displayed. A "1" indicates that the buffer contains the frame data that is inferred to be presently displayed on the display device. A "0" indicates that the buffer does not contain the frame data that is presently displayed on the display device. In operation, a buffer presently displayed status need not be maintained separately from buffer lock status (e.g., buffer lock status may be used to track the presently displayed status).

The buffer frame number illustrates the frame number corresponding to the frame data presently stored in a particular buffer. For example, during the period in which the GPU is rendering frame 4, buffer 3 (i.e., Buf[3]) contains frame data corresponding to frame 4 as it is written, while buffer 2 (i.e., Buf[2]) contains frame data for frame 3. In the next period, during which the GPU is rendering frame 5, buffer 3 continues to contain the frame data for frame 4, and it can be observed that this buffer is locked as next to be displayed, as indicated by Buf[3].LCKD. However, in the subsequent frame rendering interval (i.e., frame 6), buffer 3 is no longer locked, and buffer 4 is now indicated as locked and containing the next frame for display.

Table 300A illustrates a sequence for a fast GPU, which is able to complete rendering within a single CPU time slice, and write frame data in the immediately subsequent CPU time slice. However, in some cases the GPU may be unable to complete rendering or writing within a single CPU time slice, for example because of the complexity of the rendering, or because the CPU may interrupt operation of the GPU for various reasons. In such cases, the GPU may attempt to continue rendering the frame in subsequent CPU time slices.

Figure 3B:
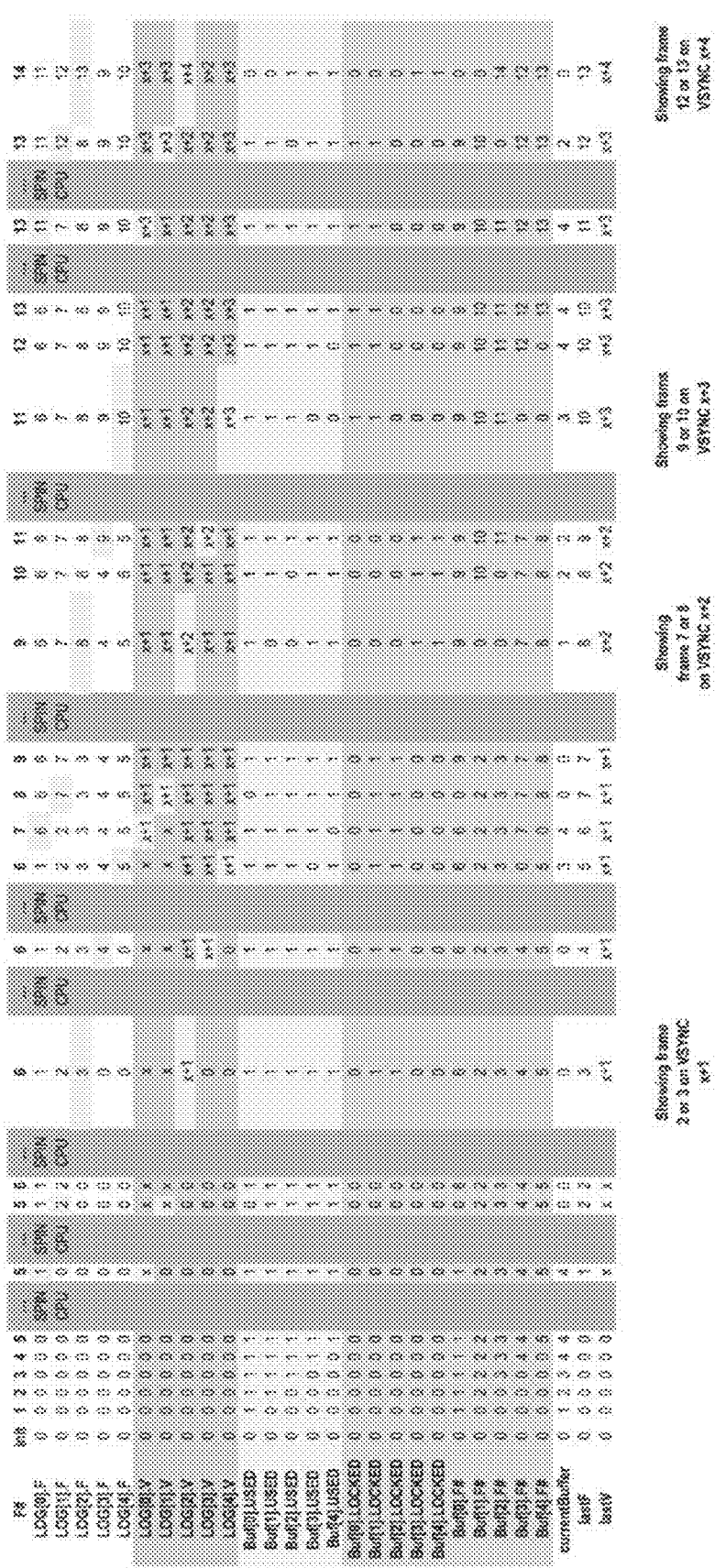

Referring now to FIG. 3B, there is illustrated another example table data generated during a display rendering sequence using one example buffering method as described herein. Table 300B is analogous to table 300A, therefore the rows of table 300B are grouped into frame index counter history (i.e., LOG[n].F), display index counter history (i.e., LOG[n].V), buffer lock status (i.e., Buf[n].LCKD), buffer presently displayed status (i.e., Buf[n].PD), and buffer frame number (i.e., Buf[n].F #). Table 300B further contains a row showing the current target buffer for rendering (i.e., currentBuffer), the most recent frame index number (lastF) and the most recent display index number (lastV). The columns of table 300B correspond to time slices of processing by a CPU, however columns marked as " . . . SPIN CPU" indicate periods in which the graphics driver delays further rendering as it has exhausted all its available buffers. In this example with 5 buffers the GPU has not reported completing any frames (i.e., an update to LOG[n].F) or the display controller reporting any VSYNC (i.e., an update to LOG[n].V).

In the example of table 300B, it can be observed that some frames may require multiple time slices to render, and may not be written to memory before a SPIN CPU event. For example, frame 1 requires five time slices to render, and a further time slice to be written. By the time rendering of frame 1 is complete, all five buffers have been locked in succession, and the GPU waits until a further time slice begins before a newly-available buffer can be targeted for rendering the next frame (e.g., frame 6). However, as the lastF row illustrates, all frame data is eventually rendered to a buffer, and the system is able to display recent frames—e.g., within 2-3 most recently-rendered frames—with every VSYNC interval after an initial spool-up.

Figure 3C:
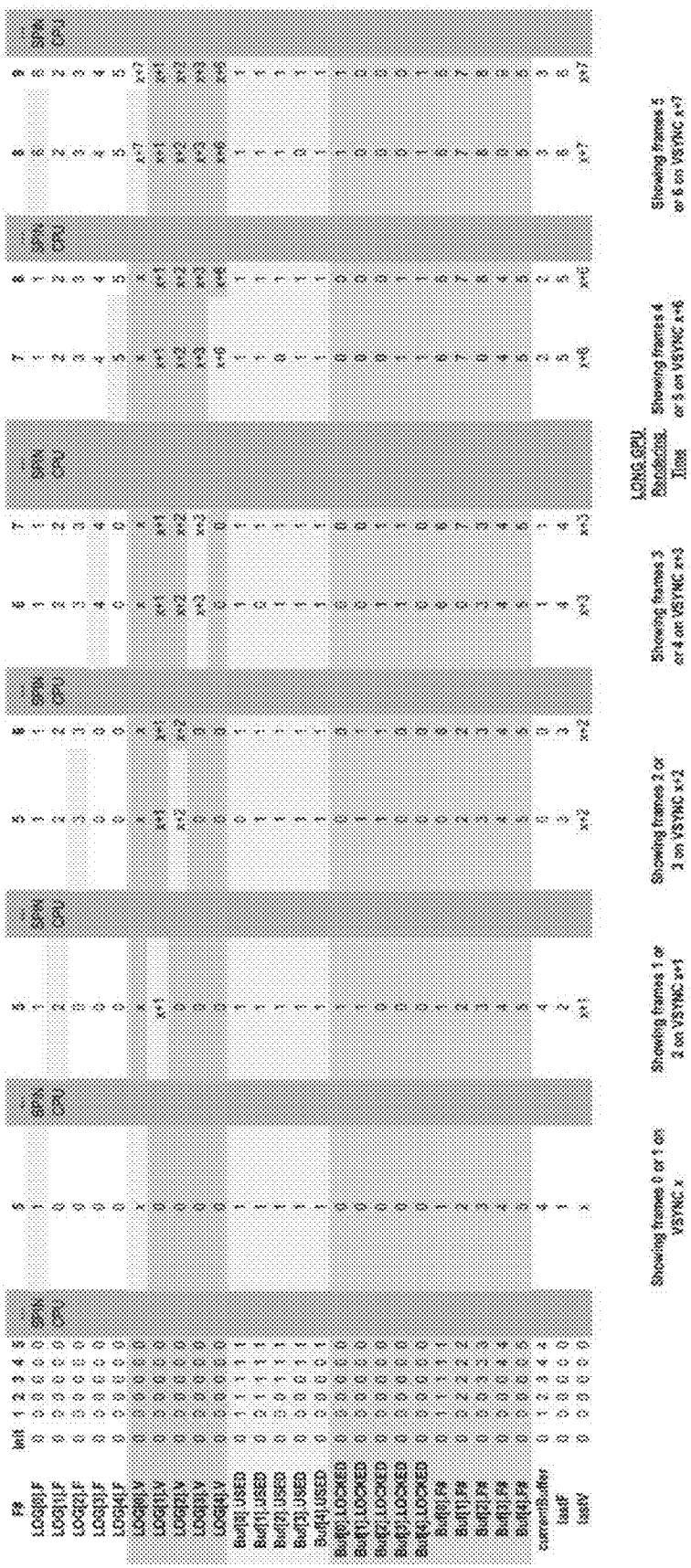

Referring now to FIG. 3C, there is illustrated another example table data generated during a display rendering sequence using one example buffering method as described herein. Table 300C is analogous to table 300B, therefore the rows of table 300C are grouped into frame index counter history (i.e., LOG[n].F), display index counter history (i.e., LOG[n].V), buffer lock status (i.e., Buf[n].LCKD), buffer presently displayed status (i.e., Buf[n].PD), and buffer frame number (i.e., Buf[n].F #). Table 300C further contains a row showing the current target buffer for rendering (i.e., currentBuffer), the most recent frame index number (lastF) and the most recent display index number (lastV). As with table 300B, the columns of table 300C correspond to time slices of processing by a CPU, and columns marked as " . . . SPIN CPU" indicate periods in which the graphics driver must delay further rendering pending feedback from the GPU. In this example with 5 buffers the GPU has not reported completing any frames (i.e., an update to LOG[n].F) or the display controller reporting any VSYNC (i.e., an update to LOG[n].V).

In the example of table 300C, it can be observed that in some cases the GPU may require multiple VSYNC intervals to render a single frame (e.g., from VSYNC interval x+3 to x+6), however, as in table 300B, all frame data is eventually rendered to a buffer, and the system is able to display recent frames—e.g., within 2-3 most recently-rendered frames—with every VSYNC interval after an initial spool-up.

Figure 3D:
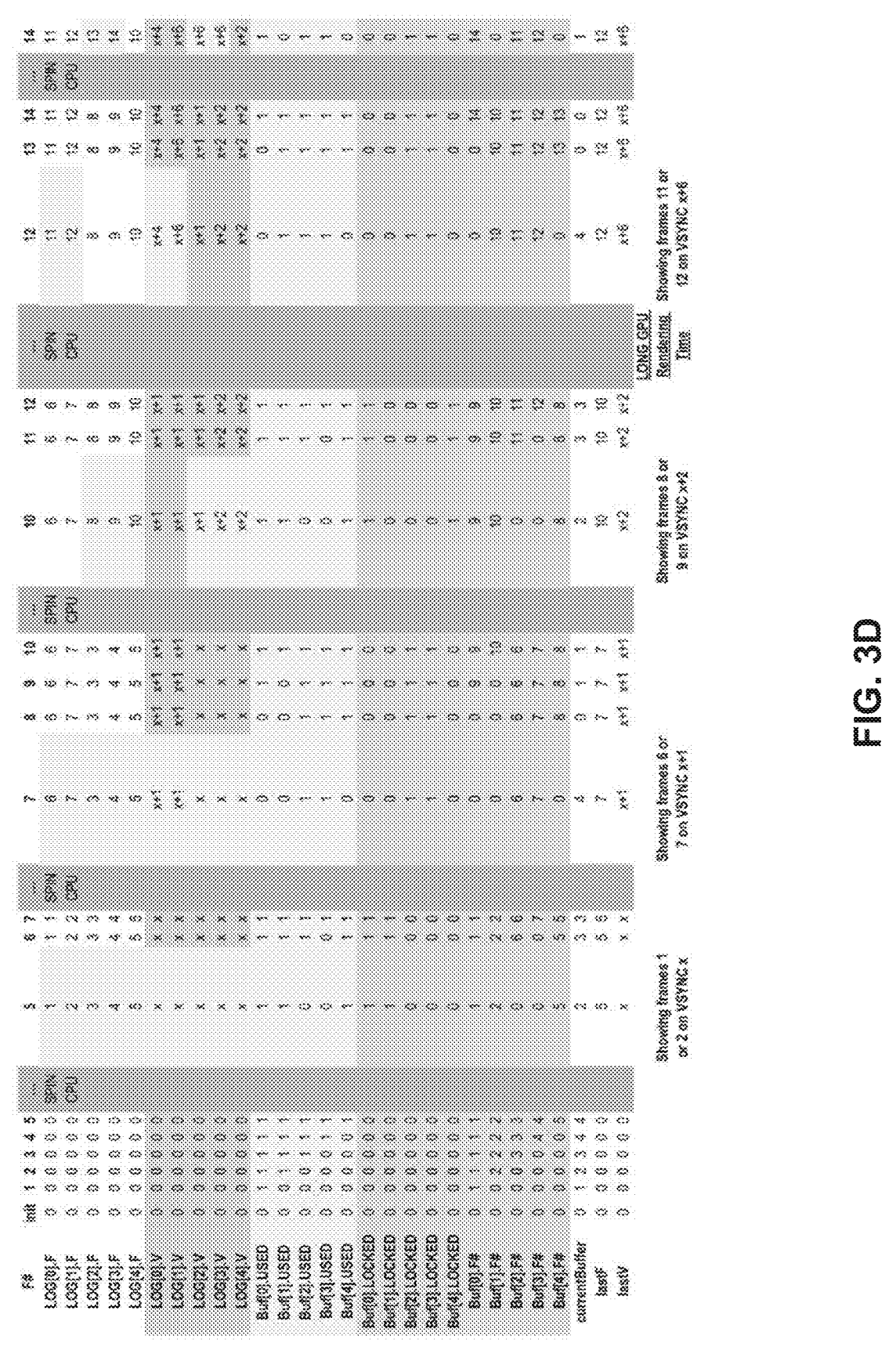

Referring now to FIG. 3D, there is illustrated another example table data generated during a display rendering sequence using one example buffering method as described herein. Table 300D is analogous to table 300C, therefore the rows of table 300D are grouped into frame index counter history (i.e., LOG[n].F), display index counter history (i.e., LOG[n].V), buffer lock status (i.e., Buf[n].LCKD), buffer presently displayed status (i.e., Buf[n].PD), and buffer frame number (i.e., Buf[n].F #). Table 300D further contains a row showing the current target buffer for rendering (i.e., currentBuffer), the most recent frame index number (lastF) and the most recent display index number (lastV). As with table 300C, the columns of table 300D correspond to time slices of processing by a CPU, and columns marked as " . . . SPIN CPU" indicate periods in which the graphics driver must delay further rendering pending feedback from the GPU.

In contrast to the example of table 300C, table 300D illustrates what may occur when a GPU operates in short bursts of rendering, such that multiple frames are rendered and written in a single CPU time slice (and VSYNC interval). For example, in the example illustrated, each of frames 1 to 5 is written during a single time slice, and during VSYNC interval x. As in previous examples, all frame data is rendered to a buffer, and the system is able to display recent frames—e.g., within 1-2 most recently-rendered frames—with every VSYNC interval after an initial spool-up.

Figure 4:
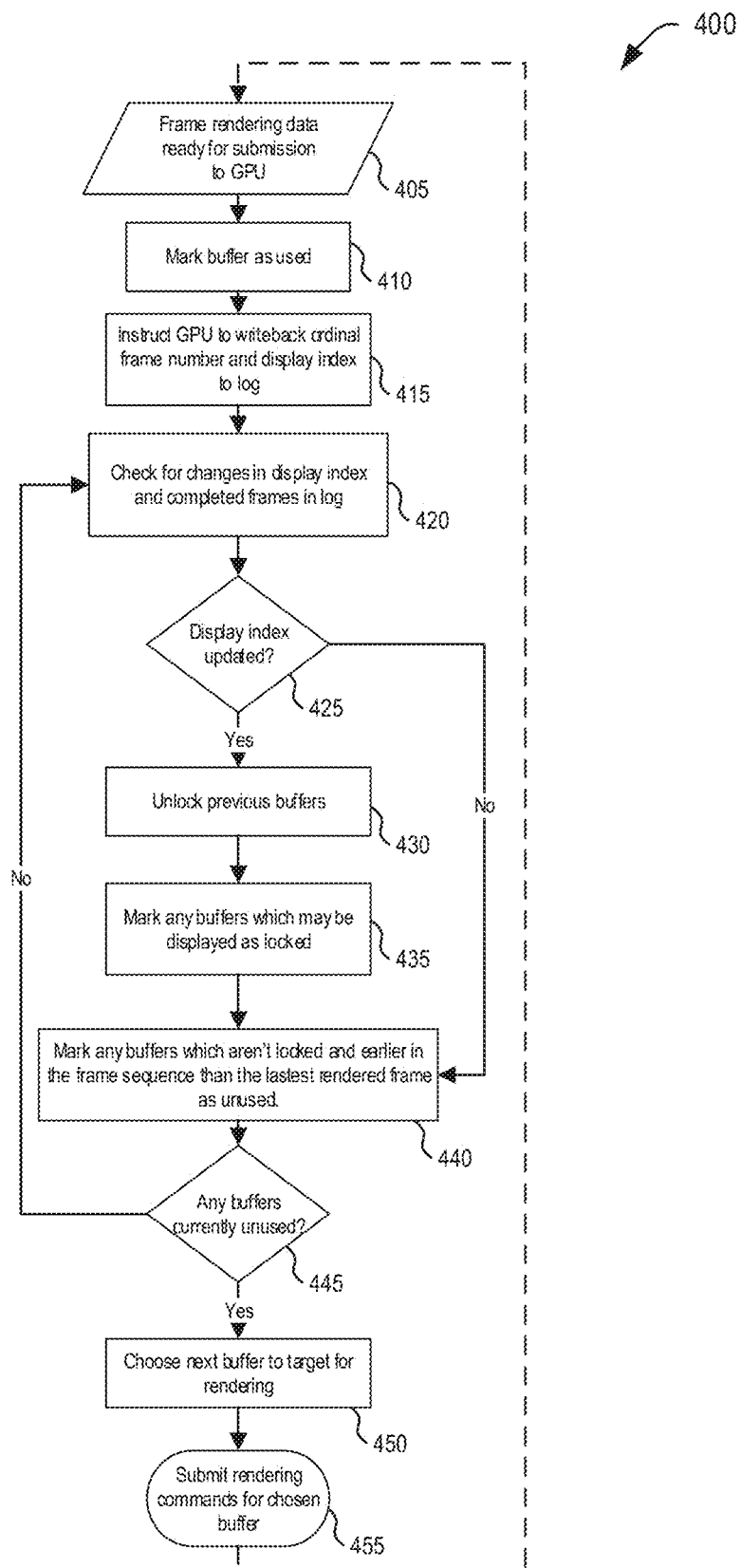
FIG. 4 is a process flow diagram for a method of asynchronously buffering rendering by a GPU to a display in a safety critical environment according to at least one embodiment.

Referring now to FIG. 4, there is illustrated a process flow diagram for a method of controlling asynchronously buffering rendering by a GPU to a display in a safety critical environment. In particular, method 400 may be performed, for example, by computer 104 and graphics system 110 as described herein. Generally, method 400 does not rely on, or require, software or hardware interrupts.

Method 400 begins by providing a plurality of buffers in a memory. In at least some embodiments, the plurality of buffers may be at least five frame buffers. In some cases, more than five frame buffers may be provided.

As described herein, the plurality of buffers may be stored in shared or system memory. Likewise, a frame index number can be tracked (e.g., using a frame index counter or array), which may comprise a plurality of entries as part of a log or history. Generally, the number of the plurality of entries in the frame index counter history is equal to or greater than the number of the plurality of buffers. Similarly, a display index number can be tracked (e.g., using a display index counter or array), which may also comprise a plurality of entries as part of the log or history. Generally, the number of the plurality of entries in the display index counter history is equal to or greater than the number of the plurality of buffers.

At 405, the CPU may gather or generate frame rendering data ready for submission to the GPU for rendering, and store the frame rendering data in a buffer from the plurality of buffers that is currently marked as unused, or available for accepting frame rendering data. The frame rendering data generally will be used to render a first new frame.

At 410, the CPU can mark the buffer as used, in response to writing the frame rendering data to the buffer at 405.

At 415, the CPU can instruct the GPU to writeback a frame index number of the first new frame, and a display index number (e.g., corresponding to the frame currently displayed on the display) to a log accessible to the CPU. As noted above, the frame index number identifies a count of frames rendered by the GPU and may be stored as a single value or as an array of values in a log. Similarly, the display index number identifies a count of frames displayed by the display and may be stored as a single value or as an array of values in a log.

At 420, the CPU checks the log to determine whether a current display index number has changed (e.g., indicating a possible vertical sync) and/or whether a frame index number has changed (e.g., indicating a new completed frame).

At 425, the CPU determines whether the current display index number has changed. If the current display index number has not changed, the CPU advances to 440. If the current display index number has changed, the CPU unlocks previously used buffers at 430.

At 435, the CPU locks one or more buffers in the plurality of buffers that may contain frames for display as potentially displayed buffers. As described herein, buffers that contain frame data associated with the currently displayed image on the display are the potentially displayed buffers. Since the CPU and GPU avoid the use of display interrupts, the CPU infers the potentially displayed buffers by identifying those buffers that have display index numbers associated with a transition from one display index number to the next. The CPU may not know whether the more recently used buffer was actually completed prior to the vertical sync interval, and therefore the previously used buffer can be marked as potentially displayed as well. Generally, there may be at least two buffers that are marked as potentially displayed.

Therefore, frames that are eligible to be considered as potentially display buffers are: 1) the buffer associated with the newest frame index number and the display index number previous to the current display index number; and 2) the buffer associated with the oldest frame index number and the current display index number. An example of such potentially displayed buffers is provided in Table A above, where buffers "c" and "d" are the potentially displayed buffers.

At 440, any buffers that are not locked and that have a frame index number lower than the last rendered frame index number can be unlocked.

At 445, the CPU may determine whether there are any buffers that are currently unused. If there are no unused buffers, the CPU may return to 420 and retry. Otherwise, the CPU may select one of the unused buffers to use as a target for the next frame's data (e.g., a second new frame) at 450.

At 455, rendering commands can be submitted to the GPU for the first new frame.

Method 400 may be repeated by the CPU as new frame data is generated for display.

The GPU can generally attend to instructions from the CPU asynchronously, and at its own operating speed. This may result in "spin CPU" situations, as described herein, but generally the system can assure that frame data is rendered reliably and without corruption.

Asynchronously to method 400, a display device can periodically perform a vertical sync and retrieve a buffer for display that is the most recently completed.

As set forth herein, the described embodiments may be implemented in a variety of computer programming languages. To aid understanding, one example pseudo-code implementation is set forth herein, however it will be understood that other implementations are possible in other programming languages or machine code:

```
/* Helper functions: */
struct frameTrackingData{
    uint32 GPF; // frame index
    uint32 VSYNC; //display index
};
static int posMod( int a, int n){
    int ret = a % n;
```

```
        if( ret < 0 ){
                ret += n;
        }
        return( ret)
}
static void getLogEntry( uint8 index, struct frameTrackingData*
entry ){
        /* Ensure both entries in the readback */
        /* log match before accepting the value */
        /* Note: Read in opposite order to GPU writes */
        do {
                entry.GPF = read RB.log[index][1].GPF;
                entry.VSYNC = read RB.log[index][1].VSYNC;
        } while( entry.GPF != read RB.log[index][0].GPF ||
                                entry.VSYNC != read RB.log[index][0].VSYNC );
}
static void getFrameLog( int32* currentIndex, struct
frameTrackingData* frameLog ){
        uint32 maxGPFIndex = 0;
        for( i = 0; i < context.numBuffers; i++){
                /* Get the log entry */
                getLogEntry( i, &frameLog[i]);
                if( frameLog[i].GPF > frameLog[maxGPFIndex].GPF ){
                        maxGPFIndex = i;
                }
        }
        /* The max GPF# should be the one most recently */
        /* written by the GPU */
        *currentIndex = maxGPFIndex;
}
/*********************************/
/* SWAP BUFFERS Logic: */
/* currentBuffer - the buffer currently being targeted for
                                rendering */
/* lastGPF - the highest frame number seen written by the GPU */
/* lastVSYNC - the highest VSYNC count seen written by the GPU */
/* buf[x] - information about each buffer: */
/*   .locked - if true implies the algorithm believes that buffer
                                may be currently displayed and so can't be
                                overwritten */
/*   .GPF# - the frame which was most recently rendered to the
                                buffer */
/*   .used - if true implies the algorithm believes that the buffer
                                contains a frame which is potentially displayed */
/* Initial conditions: */
/* - all variables and buffers are zero'd on initialization */
struct frameTrackingData frameLog[MAX_MULTI_BUFFERS_COUNT] = {0};
bool allBuffersUsed = true;
currentBuffer = &context.currentBuffer
lastGPF = &context.lastGPF
lastVSYNC = &context.lastVSYNC
buf = context.buf;
frameLog = context.frameLog;
/* Current buffer is the buffer that the driver has just finished
        targeting for rendering */
/* Mark the current buffer as used and its frame # */
buf[*currentBuffer].used = 1
buf[*currentBuffer].GPF# = {The CPU Frame# assigned to the frame
that just finished rendering}
while( notTimedOut && allBuffersUsed) {
        /* Update cached log of <frameCount,VSYNCCount> pairs */
        getFrameLog( ¤tIndex, frameLog);
        /* Cache the most recently completed frame # and the VSYNC
                count associated with it. */
        currentGPF# = frameLog[ currentIndex ].GPF
        currentVSYNCCount = frameLog[ currentIndex ].VSYNC
        /* If a VSYNC occured since last check determine which buffers
                may be currently displaying and mark them as locked */
        if( *lastVSYNC && *lastVSYNC < currentVSYNCCount ){
                /* Clear previous buffer locks */
                for( i = 0; i < context.numBuffers; i++){
                        buf[i].locked = 0;
                }
                /* Walk backwards (chronologically) through the log and
                        find the index of the first */
                /* GPF that was associated with the *last* VSYNC count
                        value. */
                /* i.e find the point where transitioned from VSYNC X to
                        VSYNC X+1 */
```

```
                index = currentIndex;
                firstIndexOnOldVSYNC = posMod(currentIndex-1,
context.numBuffers);
                for( i = 0; i < context.numBuffers-1; i++){
                        if( frameLog[ index ].VSYNC != currentVSYNCCount ){
                                firstIndexOnOldVSYNC = index;
                                break;
                        }
                        index = posMod(index-1, context.numBuffers);
                }
                /* firstIndexOnOldVSYNC is the index in the frame log where
                        transition from the last known VSYNC; need to lock the
                        frame buffer on the previous VSYNC and the first frame
                        buffer on this VSYNC. */
                for( i = 0; i < context.numBuffers; i++){
                        if( (buf[i].GPF && buf[i].GPF ==
frameLog[firstIndexOnOldVSYNC].GPF) ||
                                        (buf[i].GPF && buf[i].GPF ==
frameLog[(firstIndexOnOldVSYNC+1)%context.numBuffers].GPF)){
                                buf[i].locked = 1
                        }
                }
        }
        /* Walk through buffers and see if the GPU has finished
                rendering any frames which will result in skipping buffers
        */
        for( i = 0; i < context.numBuffers; i++){
                if( buf[i].used && !buf[i].locked && buf[i].GPF# <
currentGPF#)){
                        buf[i].used = 0
                        buf[i].GPF# = 0
                }
                if( buf[i].used == 0 && !buf[i].locked ){
                        allBuffersUsed = False;
                }
        }
 *lastGPF = currentGPF#
 *lastVSYNC = currentVSYNCCount
        /* Call user wait function */
}
/* Target the next available buffer */
current = *currentBuffer;
for( i = 1; i < context.numBuffers; i++){
    index = (*currentBuffer +i) % context.numBuffers;
    if( !buf[index].used && !buf[index].locked){
 *currentBuffer = index;
        break;
    }
}
if( current = *currentBuffer ){
    printf("All buffers marked as used!\n");
}
}
```

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A method of controlling asynchronously buffered rendering by a GPU to a display in a safety critical environment, the method comprising:
    providing a plurality of buffers, the plurality of buffers comprising at least five frame buffers;
    a CPU submitting frame rendering data corresponding to a first new frame to a GPU;
    the CPU instructing the GPU to write a frame index number of the first new frame and a display index number to a log accessible to the CPU, wherein the frame index number identifies a count of frames rendered by the GPU and the display index number identifies a count of frames displayed by the display;
    the CPU determining whether the display index number in the log has changed to a current value;
    in response to detecting that the display index number in the log has changed, the CPU determining at least two buffers in the plurality of buffers to be locked, wherein the determining comprises:
        determining a first frame buffer of the at least two buffers that is associated with a newest value of the frame index number and a previous value of the display index number, and
        determining a second frame buffer of the at least two buffers that is associated with an oldest value of the frame index number and the current value of the display index number; and the CPU locking the first frame buffer and the second frame buffer as front buffers to prevent writing.

2. The method of claim 1, further comprising unlocking one or more previously used buffers in the plurality of buffers in response to locking the at least two buffers.

3. The method of claim 2, further comprising determining at least one unused buffer from the plurality of buffers is currently unused and, in response to determining that at least one of the plurality of buffers is currently unused, selecting a new buffer from the at least one unused buffer for use in rendering a second new frame.

4. The method of claim 3, further comprising repeating, for the second new frame, the submitting frame rendering data, instructing the GPU and determining whether the display index number has changed.

5. The method of claim 2, wherein the unlocking comprises determining whether the one or more previously used buffers correspond to frames with respective frame index numbers lower than the frame index number of the first new frame.

6. The method of claim 1, wherein determining whether the display index number has changed comprises detecting that a first vertical sync has occurred.

7. The method of claim 1, wherein the plurality of buffers are stored in a memory shared by the CPU and the GPU.

8. The method of claim 1, wherein the log is stored in a memory shared by the CPU and the GPU.

9. A non-transitory computer readable medium storing computer-executable instructions, which when executed by a computer processor, cause the processor to carry out a method of controlling asynchronously buffered rendering by a GPU to a display in a safety critical environment, the method comprising:
providing a plurality of buffers, the plurality of buffers comprising at least five frame buffers;
a CPU submitting frame rendering data corresponding to a first new frame to a GPU;
the CPU instructing the GPU to write a frame index number of the first new frame and a display index number to a log accessible to the CPU, wherein the frame index number identifies a count of frames rendered by the GPU and the display index number identifies a count of frames displayed by the display;
the CPU determining whether the display index number in the log has changed to a current value; and
in response to detecting that the display index number in the log has changed, the CPU determining at least two buffers in the plurality of buffers to be locked, wherein the determining comprises:
determining a first frame buffer of the at least two buffers that is associated with a newest value of the frame index number and a previous value of the display index number, and
determining a second frame buffer of the at least two buffers that is associated with an oldest value of the frame index number and the current value of the display index number; and
the CPU locking the first frame buffer and the second frame buffer as front buffers to prevent writing.

10. An asynchronously buffered graphic display rendering system, the system comprising:
a memory storing a plurality of buffers, the plurality of buffers comprising at least five frame buffers;
a GPU;
a processor configured to:
i) submit frame rendering data corresponding to a new frame to the GPU;
ii) instruct the GPU to write a frame index number of the new frame and a display index number to a log accessible to the CPU, wherein the frame index number identifies a count of frames rendered by the GPU and the display index number identifies a count of frames displayed by the display;
iii) determine whether the display index number in the log has changed to a current value; and
iv) in response to detecting that the display index number in the log has changed, determine at least two buffers in the plurality of buffers to be locked, wherein the determining comprises: determining a first frame buffer of the at least two buffers that is associated with a newest value of the frame index number and a previous value of the display index number, determining a second frame buffer of the at least two buffers that is associated with an oldest value of the frame index number and the current value of the display index number, and locking the first frame buffer and the second frame buffer as front buffers to prevent writing; and
a display controller configured to display one of the at least two buffers upon a next vertical sync interval.

11. The system of claim 10, wherein the processor is configured to unlock one or more previously used buffers in the plurality of buffers in response to detecting that the display index number has changed.

12. The system of claim 11, wherein the processor is configured to determine that at least one unused buffer from the plurality of buffers is currently unused and, in response to determining that at least one of the plurality of buffers is currently unused, select a new buffer from the at least one unused buffer for use in rendering a second new frame.

13. The system of claim 12, wherein the processor is configured to repeat, for the second new frame, the submitting frame rendering data, instructing the GPU and determining whether the display index number has changed.

14. The system of claim 11, wherein the unlocking comprises determining whether the one or more previously used buffers correspond to frames with respective frame index numbers lower than the frame index number of the first new frame.

15. The system of claim 10, wherein determining whether the display index number has changed comprises detecting that a first vertical sync has occurred.

16. The system of claim 10, wherein the memory is shared by the CPU and the GPU.

17. The system of claim 16, wherein the log is stored in the memory.

* * * * *